Figure 1:
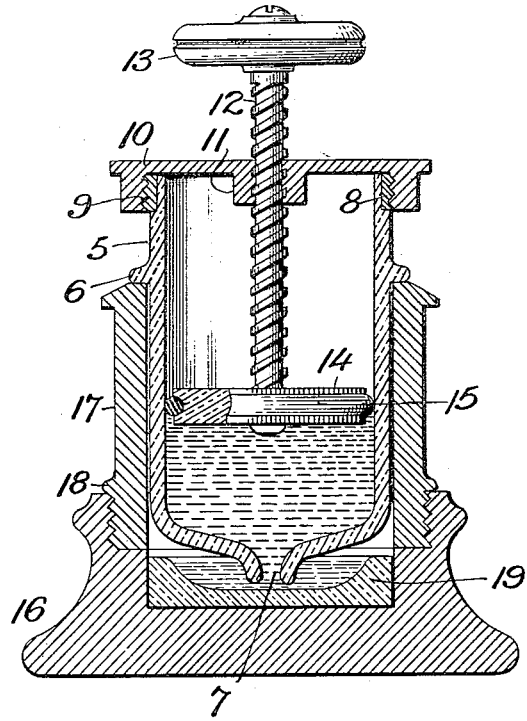

G. W. DRESSEL.
MUSTARD DISPENSER.
APPLICATION FILED JULY 28, 1908.

908,219.

Patented Dec. 29, 1908.

WITNESSES

INVENTOR
George W. Dressel,
BY
ATTORNEY

UNITED STATES PATENT OFFICE.

GEORGE W. DRESSEL, OF BROOKLYN, NEW YORK.

MUSTARD-DISPENSER.

No. 908,219.  Specification of Letters Patent.  Patented Dec. 29, 1908.

Application filed July 28, 1908. Serial No. 445,791.

*To all whom it may concern:*

Be it known that I, GEORGE W. DRESSEL, a citizen of the United States, residing at Brooklyn, in the county of Kings and State of New York, have invented new and useful Improvements in Mustard-Dispensers, of which the following is a specification.

Figure 2:
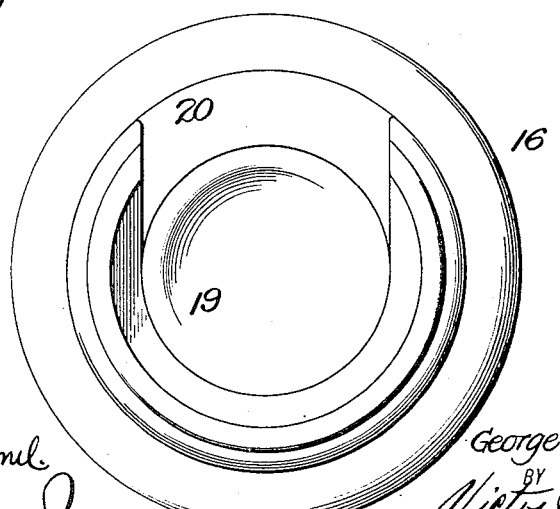

This invention relates to dispensers for condiments and particularly for mustard, salad dressings and the like and its object is to provide a compact and ornamental device which will preserve its contents in its semi-liquid state and at the same time prevent waste and the access of insects to the material while means are afforded for the use of the same as will be more fully described in the following specification, set forth in the claims and illustrated in the drawings, where:

Figure 1 is a vertical sectional view of the device. Fig. 2 is a plan view of the base.

A serious objection to the use of condiments in semi-liquid or a paste condition is their liability to dry up not only wasting the material but clogging the receptacle and causing delay in washing same. The present invention is designed to overcome these objections and provides a closed receptacle from which the material is removed in small quantities or in accordance with the demand.

The mustard or other condiment is contained in a glass or porcelain vessel 5 having a flange 6 near its upper end and a small opening 7 at its lower end. The upper end of the vessel carries a ring 8 with screw threads 9 by which a metal lid 10 is secured to the vessel and this lid has a central perforated hub 11 threaded internally to permit the play there-through of a screw 12 having at its upper end a knob 13 to turn same and at its lower end a piston 14 with a rubber packing ring 15.

The base 16 carries a cylindrical portion 17 within which is fitted the vessel 5 and upon the upper edge of which rests the flange 6 and these two parts 16 and 17 are screwed together at 18. In the bottom of the base is a socket for the saucer 19 and the base is cut away at 20 to permit of the entrance of a knife to take up some of the mustard which may be in the saucer.

When in use the semi-liquid mustard is put into the vessel and the piston withdrawn to its highest point and the lid 10 is applied and screwed down. Any pressure on the piston by the action of the screw 12 will force the mustard out of the opening 7 and it is received in the saucer 19 which is kept filled with vinegar or a similar liquid to keep this small amount of mustard fresh and soft and from this saucer the mustard may be removed when needed.

When larger quantities are needed for use the vessel 5 is easily removed from the cylinder 17 and the mustard applied direct from the opening 7 to the food.

It is obvious that the shape and construction of the receptacle may be modified without departing from the essential features above described.

What I claim as new and desire to secure by Letters Patent is:

1. A mustard dispenser comprising a base having a cutaway portion for receiving a knife blade, a cylindrical body removably engaged with the said base, a vessel removably mounted in the said body and provided with a contracted discharge opening disposed above the bottom of said base and in line with the cutaway portion thereof, and a vertically movable piston in said receptacle adapted for operation to force the contents of the receptacle through the contracted discharge opening.

2. A mustard dispenser comprising a base, a liquid receptacle carried by said base, said base having a cutaway portion disposed in line with the said liquid receptacle, a removable cylindrical body carried by said base, a mustard container removably mounted in the said cylindrical body and provided at its lower end with a discharge opening disposed directly above the said liquid receptacle, and a movable piston in the said mustard container.

3. A condiment holder comprising a base, a saucer carried by said base, said base having a cutaway portion disposed in line with the said saucer, a cylindrical body removably engaged with the said base, a vessel removably mounted in said body, said vessel having a flange adapted to engage the upper edge of said body, said receptacle having a discharge passage at its lower end and at its center disposed directly above the saucer, and a piston movable in said vessel.

In testimony whereof I affix my signature in presence of two witnesses.

GEORGE W. DRESSEL.

Witnesses:
HENRY PLUMER,
FRIEDERICH S. WARTS.